United States Patent Office 3,129,910
Patented Apr. 21, 1964

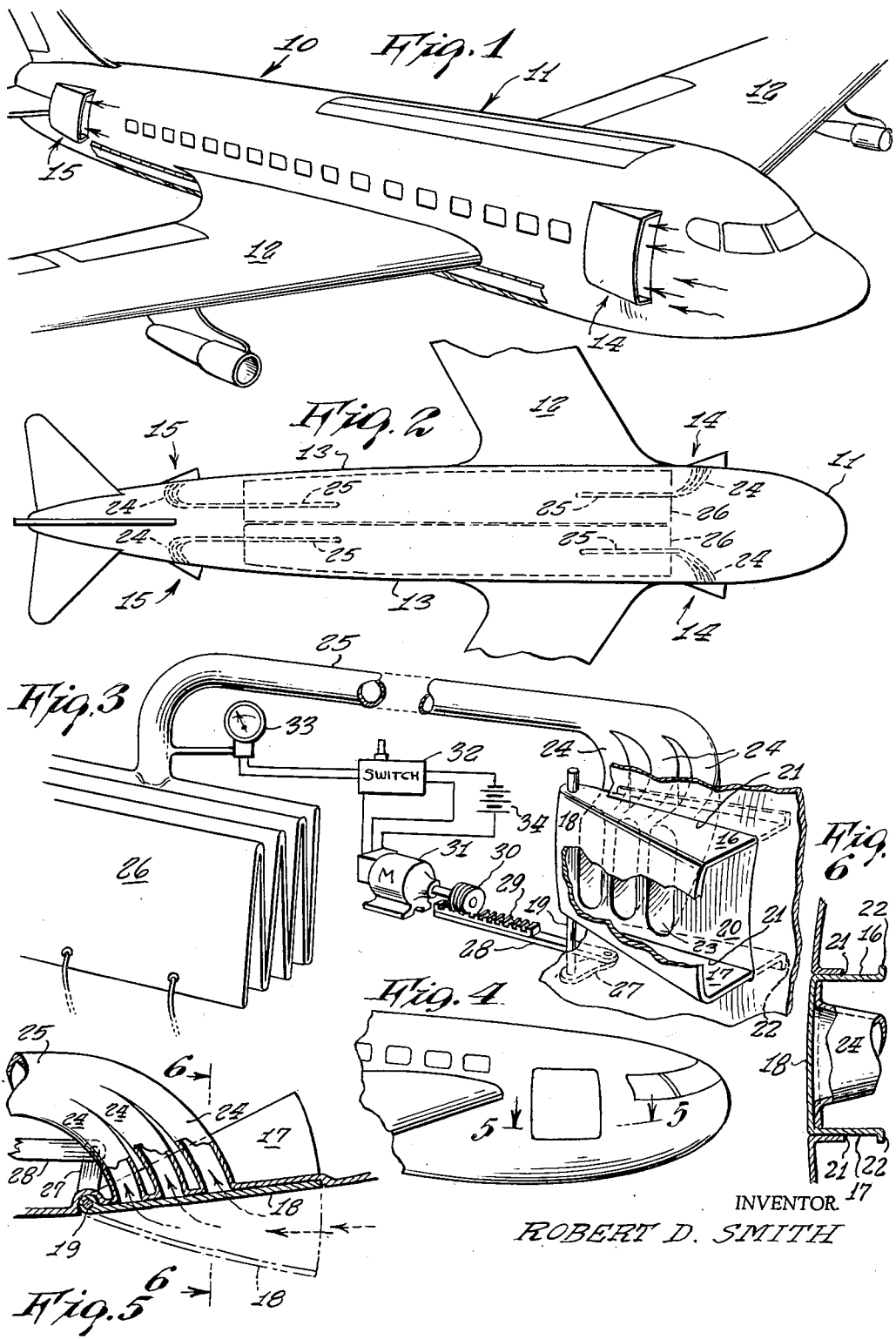

3,129,910
AIRCRAFT AIR SCOOP FOR INFLATABLE AIR BLANKET SAFETY EQUIPMENT
Robert D. Smith, 2472 E. Tremont Ave., Bronx, N.Y.
Filed Dec. 18, 1962, Ser. No. 245,468
1 Claim. (Cl. 244—107)

This invention relates generally to air delivery systems. More specifically it relates to air production devices and delivery systems for earth-bound or air-borne vehicles.

One object of the present invention is to provide an aircraft having self-contained means for producing a volume of air and delivering the same to a working end.

Another object of the present invention is to provide an aircraft having means for scooping up air in its path of flight and directing the scooped up air through conduits to any device requiring air.

A principal object of the present invention is to provide an airplane having retractable means for scooping up air in its path of flight which is used for the purpose of inflating a plurality of air-blankets located on the underside of the fuselage to protect the craft from destruction upon contact with the ground in case the craft is disabled, out of control or making an emergency landing on ground or upon the sea.

Still another object is to provide an airplane wherein the air scoop operation provides an enormous volume of air in a relatively short length of time and wherein no heavy or cumbersome machinery is required.

A further object is to provide an air scoop system for airplanes which takes advantage of the presence of air rushing past its fuselage during flight and wherein a relatively simple mechanism, which is simple to operate, can be used to direct the same into the craft for working purposes.

Still another object is to provide an air scoop system which is rugged in construction, and efficient in operation.

For further objects and for a better understanding of the invention, reference may be had to the following detailed description taken in conjunction with the accompanying drawing in which:

FIGURE 1 is a perspective view of an airplane shown incorporating the present invention in operative use.

FIGURE 2 is a fragmentary top plan view of an airplane showing the device in operative use.

FIGURE 3 is a fragmentary perspective view of one of the air scoop assemblies.

FIGURE 4 is a fragmentary perspective use of an airplane showing the air scoop in an inoperative position.

FIGURE 5 is a cross sectional view through 5—5 of FIGURE 4, and

FIGURE 6 is a cross sectional view through 6—6 of FIGURE 5.

Referring now to the drawing in detail, the numeral 10 represents an aircraft having air scoop systems according to the present invention wherein there is a fuselage 11 from which laterally projecting wings 12 extend. On each opposite side 13 of the fuselage there are two air scoops 14 and 15.

Each of the air scoops comprises a trough-like element having parallel upper and lower metal panels 16 and 17 connected to an intermediate panel 18 therebetween. The air scoop is pivotally secured on a vertical shaft 19 supported within the fuselage frame. The fuselage side wall is provided with a depression 20 within which panel 18 fits when the scoop is not in use thus permitting no projection into the air stream and disturbing the stream line of the craft, as shown in FIGURE 4. Two horizontal slots 21 are provided in the fuselage wall through which panels 16 and 17 may slide, the panels having outward turned edges 22 which serve as stops when the scoop is pulled out for use.

The fuselage side wall in the depression 20 has several openings 23 to which conduits 24 are connected, each conduit communicating with a common conduit 25 connected at its opposite end to an air blanket 26.

The scoop is operated between a fully closed position and an open position by means of lever 27 rigidly attached on shaft 19, the lever being movable by a link 28 having a worm gear rack 29 affixed thereto which is engaged by a worm 30 driven by a motor 31. A switch 32 is connected in a circuit between the motor and the airplane batteries 34, the switch being operated by the aircraft pilot. The switch may be shut off automatically by means of electrical impulses received from a pressure gauge 33 which indicates the air pressure in the air blankets. It is understood that the motor is two directionally operative thus serving to open and close the scoop.

It is to be further understood that the scoop construction may be varied and may be made to comprise a singular vertical metal panel having foldable upper and lower panels which may be made of heavy canvas in the manner of ordinary bellows.

In operative use, the pilot activates switch 32 causing motor 31 to rotate worm gear 30 thus causing rack 29 to be moved longitudinally and push end of lever 27 which rotates shaft 19 and the scoop; thus moving the scoop outwardly into the air stream as shown in FIGURES 1, 2 and 3. The on-rushing air is forced into the scoop then through openings 23 and the conduits into the air blanket. Due to the larger volume of air which can be quickly thus passed into the air blanket the pressure in the blanket activates switch 32 to reverse the motor thus closing the scoops automatically.

It should be noted that the faster the airplane travels, the faster the air is rushed into the scoops.

Thus there has been shown an aircraft air scoop that supplies an enormous volume of air at a very rapid speed and which does not require any heavy air compressor or other machine.

While various changes may be made in the detail construction, it is understood that such changes shall be within the spirit and scope of the present invention as defined by the appended claim.

What I claim as new and desire to secure by Letters Patent of the United States is:

In an airplane including a fuselage and airfoils for providing lift and further including inflatable air blanket safety equipment, the combination of a plurality of air scoops on each opposite side of said fuselage, conduits between said scoops and said air blankets, means for retracting said scoops adjacent said fuselage and means for projecting said scoop into said airstream for scooping up air in the path of said airplane, each of said air scoops comprising an upper and lower panel, an interconnecting vertical panel therebetween, a vertical shaft at one end of said scoop, the opposite end forming an air entry into said scoop, and mechanical means for rotating said shaft to retract or project said scoop relative to said air stream, said fuselage side including a depression for receiving said interconnecting vertical panel of said scoop when in retracted position, said fuselage side having slots therethrough, and said depression having a plurality of openings therethrough communicating with said conduit, each of said scoops in projected position forming a mouth at one end and a constricted throat at the opposite end, said plurality of openings comprising three openings in adjacent relationship, one of said openings being relatively close to said constricted throat and another of said openings being furthermost away from said throat and relative close to said mouth, causing a greater air pressure at the opening adjacent said throat and a lesser air pressure at the opening adjacent said mouth, thus causing currents of varied air pressure within said conduit, the currents thus tending to assimilate causing cross conduit movement of air through the longitudinal portion of said conduit.

References Cited in the file of this patent

FOREIGN PATENTS 139,376     Great Britain _____ Mar. 4, 1920